US012694575B2

(12) United States Patent
Pang et al.

(10) Patent No.: US 12,694,575 B2
(45) Date of Patent: Jul. 28, 2026

(54) PROGRESSIVE LOSSLESS POINT CLOUD ATTRIBUTE CODING

(71) Applicant: InterDigital VC Holdings, Inc., Wilmington, DE (US)

(72) Inventors: Jiahao Pang, New York, NY (US); Muhammad Asad Lodhi, New York, NY (US); Dong Tian, Wilmington, DE (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 45 days.

(21) Appl. No.: 19/020,569

(22) Filed: Jan. 14, 2025

(65) Prior Publication Data

US 2026/0203954 A1     Jul. 16, 2026

(51) Int. Cl.
G06T 9/40        (2006.01)
G06T 9/00        (2006.01)

(52) U.S. Cl.
CPC ................ G06T 9/002 (2013.01); G06T 9/40 (2013.01)

(58) Field of Classification Search
CPC ....................................................... G06T 9/40
See application file for complete search history.

(56) References Cited

U.S. PATENT DOCUMENTS

2021/0329055 A1* 10/2021 Hur ........................ H04L 65/762
2023/0075442 A1* 3/2023 Ma ........................... G06T 9/001
2026/0073568 A1* 3/2026 Huang .................... G06T 9/001

OTHER PUBLICATIONS

Vaswani et al., "Attention Is All You Need", 31st International Conference on Neural Information Processing Systems (NIPS 2017), arXiv:1706.03762v7 [cs.CL] Long Beach, CA, Aug. 2, 2023,15 pages.
Wang et al., "Multiscale Point Cloud Geometry Compression", 2021 Data Compression Conference IEEE, Mar. 23, 2021, pp. 73-82.

* cited by examiner

*Primary Examiner* — Jayanti K Patel
*Assistant Examiner* — Christopher Kingsbury Glover
(74) *Attorney, Agent, or Firm* — Xiaoan Lu

(57) ABSTRACT
In one implementation, a method of encoding or decoding point cloud data is provided, comprising: obtaining upsampled attributes of a previous octree level of the point cloud data; predicting attributes of a current voxel group of a current octree level of the point cloud data, based on attributes of already encoded/decoded voxel groups in the current octree level and the upsampled attributes of the previous octree level; obtaining a probability distribution of the current voxel group, based on the predicted attributes of the current voxel group; and encoding the current voxel group into a bitstream or decoding the current voxel group from an input bitstream, based on the probability distribution of the current voxel group.

20 Claims, 8 Drawing Sheets

PROGRESSIVE LOSSLESS POINT CLOUD ATTRIBUTE CODING

BACKGROUND

The present application is related to point cloud compression and processing.

The Point Cloud (PC) data format is a universal data format across several business domains, e.g., from autonomous driving, robotics, augmented reality/virtual reality (AR/VR), civil engineering, computer graphics, to the animation/movie industry. 3D LiDAR (Light Detection and Ranging) sensors have been deployed in self-driving cars, and affordable LiDAR sensors are released from Velodyne Velabit, Apple ipad Pro 2020 and Intel RealSense LiDAR camera L515. With advances in sensing technologies, 3D point cloud data becomes more practical than ever and is expected to be an ultimate enabler in the applications discussed herein.

BRIEF SUMMARY

Briefly stated, in one embodiment, a method of decoding point cloud data is presented, comprising: obtaining upsampled attributes of a previous octree level of the point cloud data; predicting attributes of a current voxel group of a current octree level of the point cloud data, based on attributes of already decoded voxel groups in the current octree level and the upsampled attributes of the previous octree level; obtaining a probability distribution of the current voxel group, based on the predicted attributes of the current voxel group; and decoding the current voxel group from an input bitstream, based on the probability distribution of the current voxel group.

According to another embodiment, a method of encoding point cloud data is presented, comprising: obtaining upsampled attributes of a previous octree level of the point cloud data; predicting attributes of a current voxel group of a current octree level of the point cloud data, based on attributes of already encoded voxel groups in the current octree level and the upsampled attributes of the previous octree level; obtaining a probability distribution of the current voxel group, based on the predicted attributes of the current voxel group; and encoding the current voxel group from an input bitstream, based on the probability distribution of the current voxel group.

According to another embodiment, an apparatus for decoding point cloud data is presented, comprising one or more processors and at least one memory coupled to the one or more processors, wherein the one or more processors are configured to: obtain upsampled attributes of a previous octree level of the point cloud data; predict attributes of a current voxel group of a current octree level of the point cloud data, based on attributes of already decoded voxel groups in the current octree level and the upsampled attributes of the previous octree level; obtain a probability distribution of the current voxel group, based on the predicted attributes of the current voxel group; and decode the current voxel group from an input bitstream, based on the probability distribution of the current voxel group.

According to another embodiment, an apparatus for encoding point cloud data, comprising one or more processors and at least one memory coupled to the one or more processors, wherein the one or more processors are configured to: obtain upsampled attributes of a previous octree level of the point cloud data; predict attributes of a current voxel group of a current octree level of the point cloud data, based on attributes of already encoded voxel groups in the current octree level and the upsampled attributes of the previous octree level; obtain a probability distribution of the current voxel group, based on the predicted attributes of the current voxel group; and encode the current voxel group based on the probability distribution of the current voxel group.

BRIEF DESCRIPTION OF THE DRAWINGS

The following detailed description will be better understood when read in conjunction with the appended drawings, in which there are shown examples of one or more of the multiple embodiments of the present disclosure. It should be understood, however, that the embodiments described herein are not limited to the precise arrangements and instrumentalities shown in the drawings. In the drawings.

DETAILED DESCRIPTION

Figure 1:
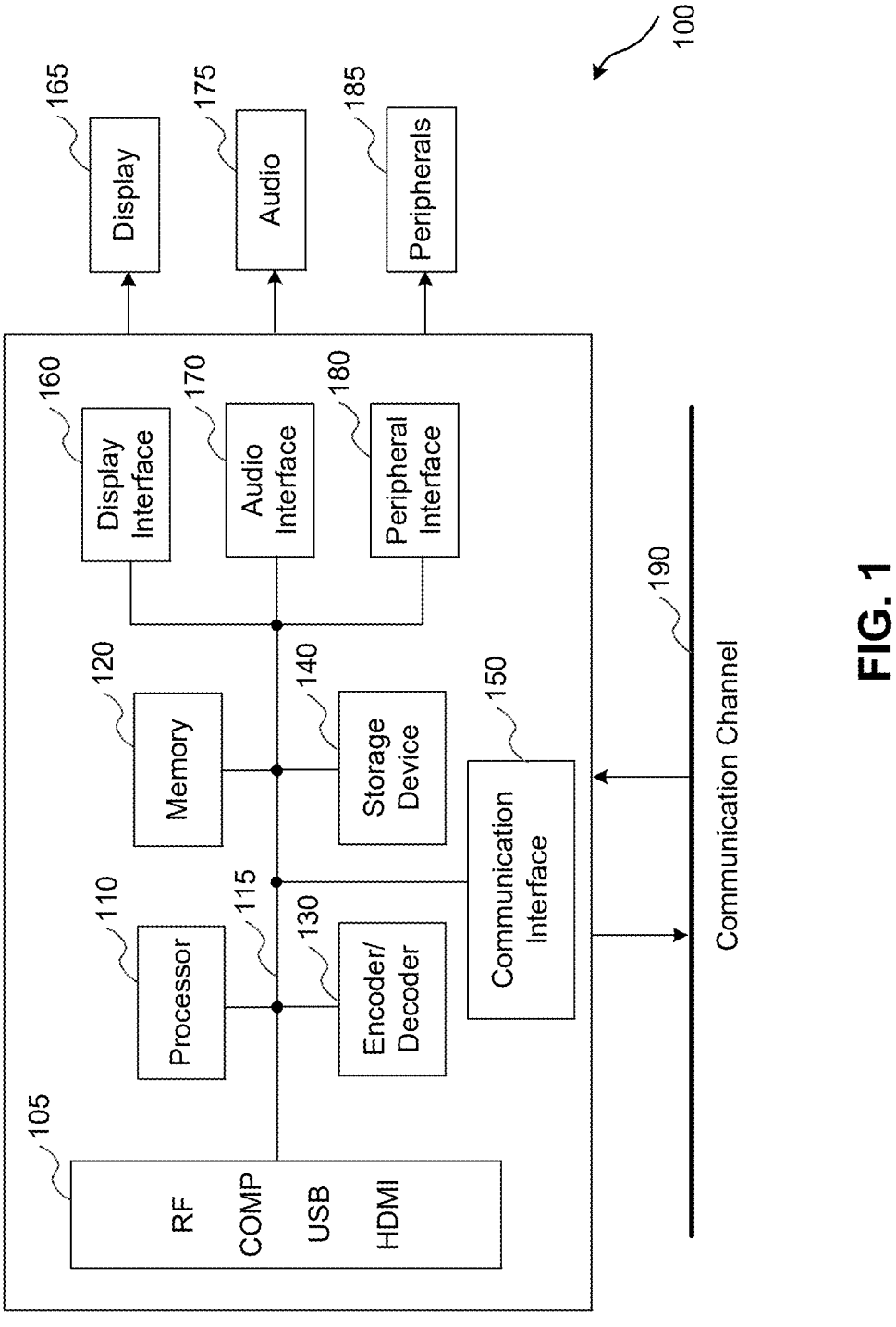
FIG. 1 illustrates a block diagram of a system within which aspects of the present embodiments may be implemented.

In describing the various embodiments of the present disclosure, certain terminology is used herein for convenience only and should not be considered as limiting such embodiments. In the drawings, the same reference numerals are employed for designating the same elements throughout the several figures and the present description.

Referring to the drawings, there is shown in FIG. 1 a block diagram of an example of a system in which various aspects and embodiments can be implemented. System 100 may be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 100, singly or in combination, may be embodied in a single integrated circuit, multiple ICs, and/or discrete components. For example, in at least one embodiment, the processing and encoder/decoder elements of system 100 are distributed across multiple ICs and/or discrete components. In various embodiments, the system 100 is communicatively coupled to other systems, or to other electronic devices, via, for example, a communications bus or through dedicated input and/or output ports. In various embodiments, the system 100 is configured to implement one or more of the aspects described in this application.

The system 100 includes at least one processor 110 configured to execute instructions loaded therein for implementing, for example, the various aspects described in this application. Processor 110 may include embedded memory, input output interface, and various other circuitries as known in the art. The system 100 includes at least one memory 120 (e.g., a volatile memory device, and/or a non-volatile memory device). System 100 includes a storage device 140, which may include non-volatile memory and/or volatile memory, including, but not limited to, EEPROM, ROM, PROM, RAM, DRAM, SRAM, flash, magnetic disk drive, and/or optical disk drive. The storage device 140 may include an internal storage device, an attached storage device, and/or a network accessible storage device, as non-limiting examples.

System 100 includes an encoder/decoder module 130 configured, for example, to process data to provide an encoded video or decoded video, and the encoder/decoder module 130 may include its own processor and memory. The encoder/decoder module 130 represents module(s) that may be included in a device to perform the encoding and/or decoding functions. As is known, a device may include one or both of the encoding and decoding modules. Additionally, encoder/decoder module 130 may be implemented as a separate element of system 100 or may be incorporated within processor 110 as a combination of hardware and software as known to those skilled in the art.

Program code to be loaded onto processor 110 or encoder/decoder 130 to perform the various aspects described in this application may be stored in storage device 140 and subsequently loaded onto memory 120 for execution by processor 110. In accordance with various embodiments, one or more of processor 110, memory 120, storage device 140, and encoder/decoder module 130 may store one or more of various items during the performance of the processes described in this application. Such stored items may include, but are not limited to, the input video, the decoded video or portions of the decoded video, the bitstream, matrices, variables, and intermediate or final results from the processing of equations, formulas, operations, and operational logic.

In several embodiments, memory inside of the processor 110 and/or the encoder/decoder module 130 is used to store instructions and to provide working memory for processing that is needed during encoding or decoding. In other embodiments, however, a memory external to the processing device (for example, the processing device may be either the processor 110 or the encoder/decoder module 130) is used for one or more of these functions. The external memory may be the memory 120 and/or the storage device 140, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, JPEG Pleno, MPEG-I, HEVC, or VVC.

The input to the elements of system 100 may be provided through various input devices as indicated in block 105. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 105 have associated respective input processing elements as known in the art. For example, the RF portion may be associated with elements suitable for (i) selecting a desired frequency (also referred to as selecting a signal, or band-limiting a signal to a band of frequencies), (ii) down converting the selected signal, (iii) band-limiting again to a narrower band of frequencies to select (for example) a signal frequency band which may be referred to as a channel in certain embodiments, (iv) demodulating the down converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion may include a tuner that performs various of these functions, including, for example, down converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down converting, and filtering again to a desired frequency band. Various embodiments rearrange the order of the above-described (and other) elements, remove some of these elements, and/or add other elements performing similar or different functions. Adding elements may include inserting elements in between existing elements, for example, inserting amplifiers and an analog-to-digital converter. In various embodiments, the RF portion includes an antenna.

Additionally, the USB and/or HDMI terminals may include respective interface processors for connecting system 100 to other electronic devices across USB and/or HDMI connections. It is to be understood that various aspects of input processing, for example, Reed-Solomon error correction, may be implemented, for example, within a separate input processing IC or within processor 110 as necessary. Similarly, aspects of USB or HDMI interface processing may be implemented within separate interface ICs or within processor 110 as necessary. The demodulated, error corrected, and demultiplexed stream is provided to various processing elements, including, for example, processor 110, and encoder/decoder 130 operating in combination with the memory and storage elements to process the datastream as necessary for presentation on an output device.

Various elements of system 100 may be provided within an integrated housing. Within the integrated housing, the various elements may be interconnected and transmit data therebetween using suitable connection arrangement 115, for example, an internal bus as known in the art, including the I2C bus, wiring, and printed circuit boards.

The system 100 includes communication interface 150 that enables communication with other devices via communication channel 190. The communication interface 150 may include, but is not limited to, a transceiver configured to transmit and to receive data over communication channel 190. The communication interface 150 may include, but is not limited to, a modem or network card and the communication channel 190 may be implemented, for example, within a wired and/or a wireless medium.

Data is streamed to the system 100, in various embodiments, using a Wi-Fi network such as IEEE 802.11. The Wi-Fi signal of these embodiments is received over the communications channel 190 and the communications interface 150 which are adapted for Wi-Fi communications. The communications channel 190 of these embodiments is typically connected to an access point or router that provides access to outside networks including the Internet for allowing streaming applications and other over-the-top communications. Other embodiments provide streamed data to the system 100 using a set-top box that delivers the data over the HDMI connection of the input block 105. Still other embodiments provide streamed data to the system 100 using the RF connection of the input block 105.

The system 100 may provide an output signal to various output devices, including a display 165, speakers 175, and other peripheral devices 185. The other peripheral devices 185 include, in various examples of embodiments, one or more of a stand-alone DVR, a disk player, a stereo system, a lighting system, and other devices that provide a function based on the output of the system 100. In various embodiments, control signals are communicated between the system 100 and the display 165, speakers 175, or other peripheral devices 185 using signaling such as AV. Link, CEC, or other communications protocols that enable device-to-device control with or without user intervention. The output devices may be communicatively coupled to system 100 via dedicated connections through respective interfaces 160, 170, and 180. Alternatively, the output devices may be connected to system 100 using the communications channel 190 via the communications interface 150. The display 165 and speakers 175 may be integrated in a single unit with the other components of system 100 in an electronic device, for example, a television. In various embodiments, the display interface 160 includes a display driver, for example, a timing controller (T Con) chip.

The display 165 and speaker 175 may alternatively be separate from one or more of the other components, for example, if the RF portion of input 105 is part of a separate set-top box. In various embodiments in which the display 165 and speakers 175 are external components, the output signal may be provided via dedicated output connections, including, for example, HDMI ports, USB ports, or COMP outputs.

Point Cloud Data Format

Point cloud data is also believed to consume a large portion of network traffic, e.g., among connected cars over 5G network, and immersive communications (VR/AR). Efficient representation formats are necessary for point cloud understanding and communication. In particular, raw point cloud data needs to be properly organized and processed for the purposes of world modeling and sensing. Compression on raw point clouds is essential when storage and transmission of the data are required in the related scenarios.

Furthermore, point clouds may represent a sequential scan of the same scene, which contains multiple moving objects. They are called dynamic point clouds as compared to static point clouds captured from a static scene or static objects. Dynamic point clouds are typically organized into frames, with different frames being captured at different times. Dynamic point clouds may require the processing and compression to be in real-time or with low delay.

Each point of the point clouds is represented at least by a 3D position (x, y, z). The set of the 3D positions illustrates the geometry of the object/scene that the point cloud is captured from. Additionally, each point of the point cloud can be associated with some attributes, depending on the applications. For example, for VR/AR/Gaming, the attribute includes color (r, g, b), and for LiDAR, the attribute includes reflectance.

Point Cloud Data Use Cases

The automotive industry and autonomous car are domains in which point clouds may be used. Autonomous cars should be able to "probe" their environment to make good driving decisions based on the reality of their immediate surroundings. Typical sensors like LiDARs produce (dynamic) point clouds that are used by the perception engine. These point clouds are not intended to be viewed by human eyes and they are typically sparse, not necessarily colored, and dynamic with a high frequency of capture. They may have other attributes like the reflectance ratio provided by the LiDAR as this attribute is indicative of the material of the sensed object and may help in making a decision.

Virtual Reality (VR) and immersive worlds have become a hot topic and foreseen by many as the future of 2D flat video. The basic idea is to immerse the viewer in an environment all around the viewer as opposed to standard TV where the viewer can only look at the virtual world in front of the viewer. There are several gradations in the immersivity depending on the freedom of the viewer in the environment. Point cloud is a good format candidate to distribute VR worlds. They may be static or dynamic and are typically of average size, say no more than millions of points at a time.

Point clouds may also be used for various purposes such as culture heritage/buildings in which objects like statues or buildings are scanned in 3D to share the spatial configuration of the object without sending or visiting it. Also, it is a way to ensure preserving the knowledge of the object in case it may be destroyed, for instance, a temple by an earthquake. Such point clouds are typically static, colored, and huge.

Another use case is in topography and cartography in which using 3D representations, maps are not limited to the plane and may include the relief. Google Maps is now a good example of 3D maps but uses meshes instead of point clouds. Nevertheless, point clouds may be a suitable data format for 3D maps and such point clouds are typically static, colored, and huge.

World modeling and sensing via point clouds could be an essential technology to allow machines to gain knowledge about the 3D world around them, which is crucial for the applications discussed above.

3D point cloud data are essentially discrete samples on the surfaces of objects or scenes. To fully represent the real world with point samples, in practice it requires a huge number of points. For instance, a typical VR immersive scene contains millions of points, while point clouds typically contain hundreds of millions of points. Therefore, the processing of such large-scale point clouds is computationally expensive, especially for consumer devices, e.g., smartphone, tablet, and automotive navigation system, that have limited computational power.

The first step for any processing or inference on the point cloud is to have efficient storage methodologies. To store and process the input point cloud with affordable computational cost, one solution is to down-sample it first, where the down-sampled point cloud summarizes the geometry of the input point cloud while having much fewer points. The down-sampled point cloud is then fed to the subsequent machine task for further consumption. However, further reduction in storage space can be achieved by converting the raw point cloud data (original or down sampled) into a bitstream through entropy coding techniques for lossless compression.

Learning-Based Point Cloud Compression

Since point cloud data is composed of two components: geometry information and attribute information, the compression of point clouds can be classified into two categories: geometry coding and attribute coding. This work is focused on attribute coding and assumes that the geometry information of the point cloud is already coded and available at both encoder and decoder.

Examples of existing learning-based point cloud attribute compression techniques are deep octree-based attribute compression and end-to-end feature-based attribute coding. With deep octree-based attribute compression, neural network-based models are utilized to estimate the discrete probability distribution of the attribute values. Such estimated probabilities are then used to help the arithmetic coder to encode or decode the attribute value(s) associated with that particular point. Our work belongs to deep octree-based attribute compression for lossless coding.

Figure 2:
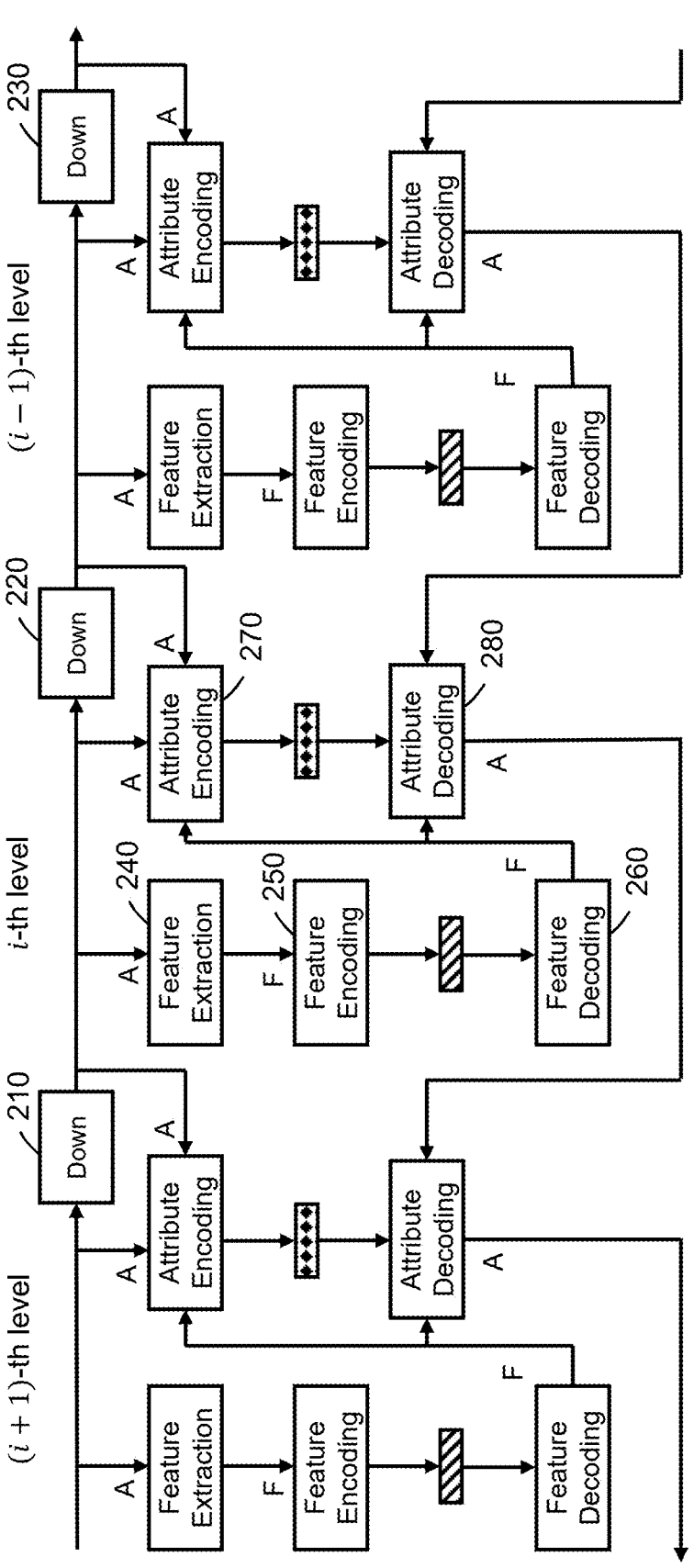
FIG. 2 illustrates lossless attribute coding.

To begin with, we first discuss a lossless attribute coding framework from a commonly owned U.S. application Ser. No. 18/830,310, entitled "An End-To-End Learning-Based Point Cloud Attribute Coding Framework", illustrated in FIG. 2. Given a point cloud with attributes, our target is to encode the attributes as a bitstream assuming the point cloud geometry is available. On the decoder, the bitstream is to be losslessly decoded into attributes, assuming the point cloud geometry is available.

Encoding

The encoding process is proceeded in two passes. In the first pass, the objective is to compute the downsampled point cloud with attributes at each octree level. This pass traverses the octree in a bottom-up manner. Particularly, the point cloud at the original octree level is gradually downsampled with the Downsample module (210, 220, 230), until the root octree level with only one voxel is reached.

The second pass traverses the octree in a top-down manner, which encodes the attributes one level by one level. We take the encoding of the attributes at the i-th octree level, denoted as $A_i$, as an example. Firstly, it is processed by the Feature Extraction module (240) to extract a high-level feature representing the attributes $A_i$. Here the Feature Extraction module is a neural network-based module, which can be constructed with 3D sparse convolutional layers, Inception ResNet (IRN) blocks, transformer blocks, etc. The extracted feature is then encoded into a bitstream by the Feature Encoding module (250). By decoding the bitstream with the Feature Decoding module (260), the reconstructed feature, denoted as $F_i$, is obtained. This feature $F_i$ will be used to assist the lossless encoding of the attribute. Next, the Attribute Encoding module (270) is launched to encode $A_i$. It takes as inputs the current-level attributes $A_i$, the feature $F_i$, the previous-level attributes $A_{i-1}$ which has already encoded, and encodes $A_i$ into a bitstream. This encoding process repeats for each octree level until the finest level is reached.

Decoding

The decoding process is a one-pass process which proceeds level by level along the octree in a top-down manner. We take the decoding of the attributes at the i-the octree level ($A_i$) as an example to describe the decoding process of an octree level. Firstly, the Feature Decoding module (260) decodes the bitstream and obtain the reconstructed feature $F_i$. This feature $F_i$ will be used to assist the lossless decoding of the attribute. Next, the Attribute Decoding module (280) is launched to decode $A_i$. It takes as inputs the bitstream, the feature $F_i$, the previous-level attributes $A_{i-1}$ which has already decoded, and decodes $A_i$. This decoding process repeats for each octree level until the finest level is reached.

This work aims at improving the Attribute Encoding and Attribute Decoding modules (FIG. 2), by improving the probability estimation of the attribute values. To begin with, more details about the Attribute Encoding and Attribute Decoding are illustrated hereby.

Voxel-by-Voxel Coding

To code the attributes of each octree level, e.g., the i-th level, the Attribute Encoding and Attribute Decoding takes a multi-step approach described in a commonly owned U.S. application Ser. No. 18/830,379, entitled "A Voxel-Wise

8

Figure 3:
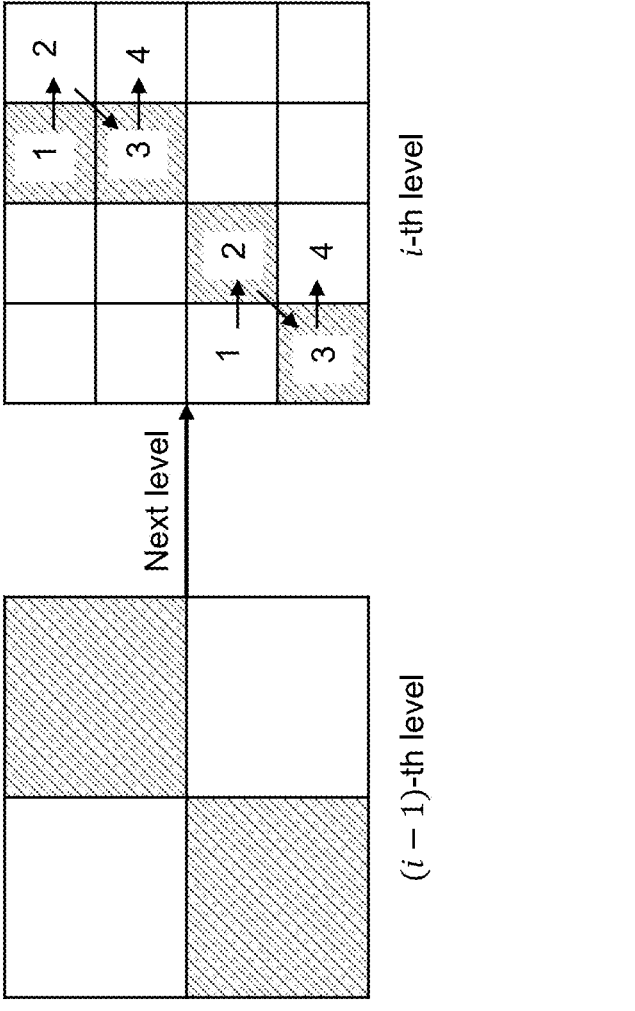
FIG. 3 illustrates a coding order, where attributes of the voxels are coded in multiple steps.

Coding Control Method for Lossless Point Cloud Compression", which is shown in FIG. 3. Firstly, the voxels in the current octree level are classified into several groups according to their positions relative to their parents. Thus, in 2D there will be 4 groups while in 3D there will be 8 groups. Rather than coding all the groups at one time, they are coded with more than one steps. Therefore, the groups that being coded later can use the earlier already coded groups at the same octree level to estimate the probabilities, leading to more precise probability estimation, Hence, a smaller bitstream can be achieved.

In the example of FIG. 3, we code one group at one time, leading to voxel-by-voxel coding approach. For the voxels that are empty, the coding of them can be skipped. Thus, in this particular example, we code the occupied voxel labeled as "1" first, then proceed to the occupied voxel labeled as "2", then we code the two occupied voxels labeled as "3". Since there is no voxel labeled as "4" is occupied, the fourth step can be skipped.

Attribute Encoding and Attribute Decoding

Figure 4:
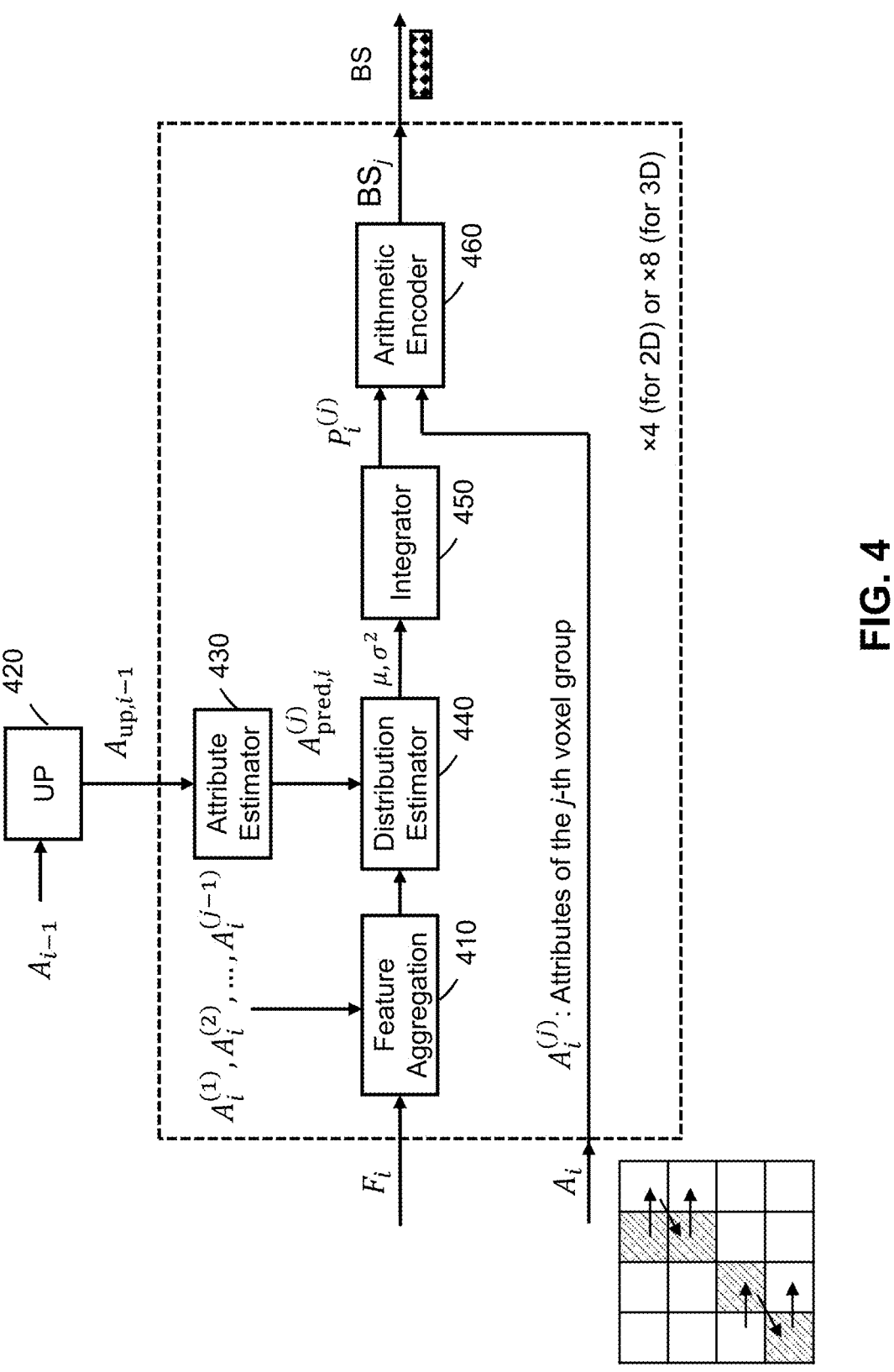
FIG. 4 illustrates an attribute encoding module.
Figure 5:
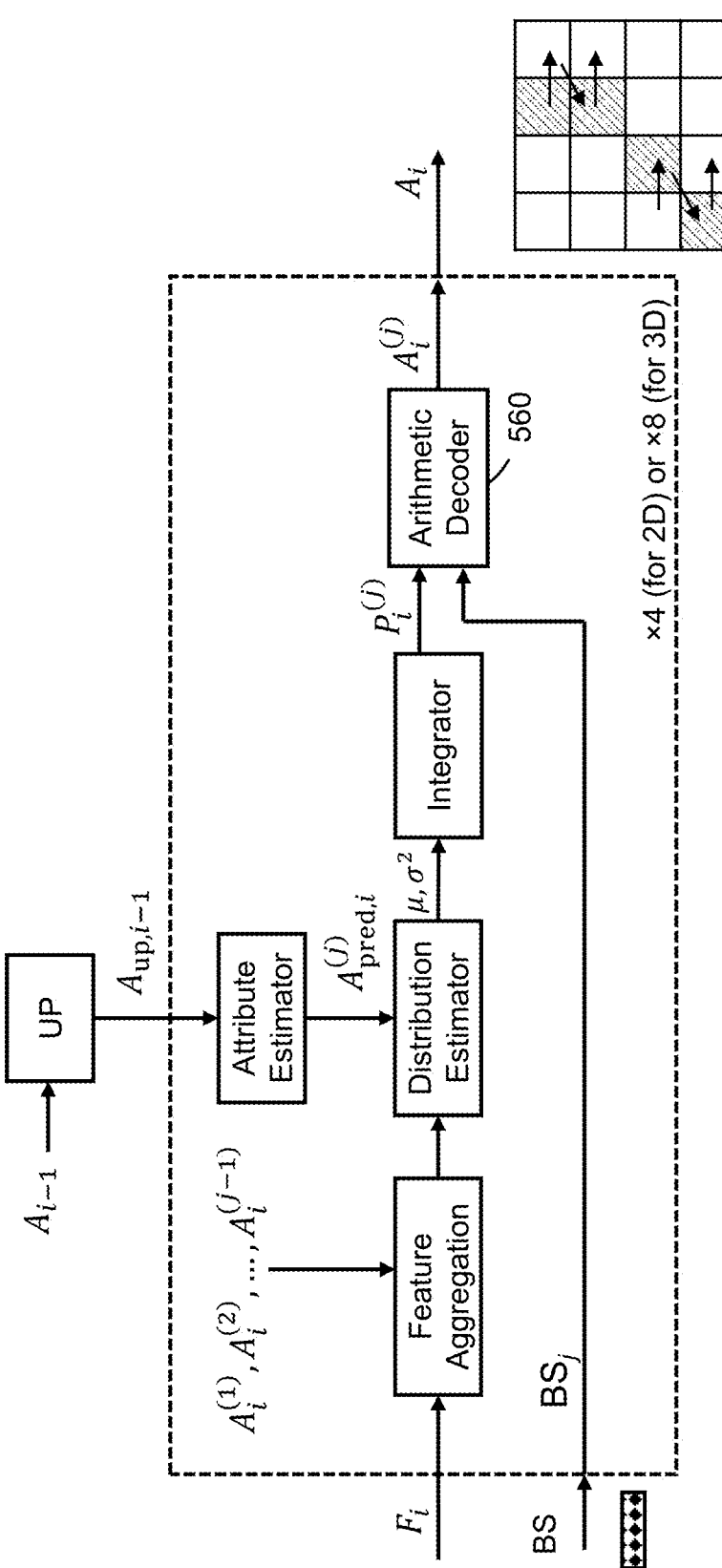
FIG. 5 illustrates an attribute decoding module.

With the voxel-by-voxel coding strategy, the designs of the Attribute Encoding module and the Attribute Decoding module are provided in FIG. 4 and FIG. 5.

Attribute Encoding: The Attribute Encoding module proceeds in an iterative manner, with at most 8 iterations for 3D or 4 iterations in 2D, where the j-th iteration is to encode the j-th voxel group, denoted by $$A_i^{(j)}.$$

A voxel group corresponds to all the occupied voxels located in the same octant with respect to their parent voxels. In other words, the voxels in the same voxel group have the same relative positions with respective to their parent voxel. For example, in FIG. 3, the two voxels labeled by "3" belong to the same voxel group because they are both locating at the bottom left position relative to their parents. The steps of attribute encoding are as follows.

(1) The Feature Aggregation module (410) takes as input the feature $F_i$, and all the previously encoded voxel groups, $$A_i^{(1)}, A_i^{(2)}, \ldots, A_i^{(j-1)},$$

and computes an updated feature. The Feature Aggregation module is a neural-network-based module, which can be constructed with 3D sparse convolutional layers, Inception ResNet (IRN) blocks, transformer blocks, etc.

(2) The Upsample module (420) takes as input the attributes of the previous level, $A_{i-1}$, and outputs its upsampled version, denoted as $A_{up,i-1}$.

(3) The Attribute Estimator module (430) is launched. It is to provide a prediction for the current voxel group $$A_i^{(j)}.$$

It takes the upsampled attribute $A_{up,i-1}$ as input and computes a predictor $$A_{pred,i}^{(j)}$$

to predict $$A_i^{(j)}.$$

In one example, the predictor $$A_{pred,i}^{(j)}$$

is simply the j-th voxel group of $A_{up,i-1}$. In other words, $$A_{pred,i}^{(j)} = A_{up,i-1}^{(j)}.$$

(4) Then the Distribution Estimator module (440) is launched. It is to estimate the probability distribution parameters for the current voxel group to be encoded, e.g., the mean and the variance. The Distribution Estimator module takes two inputs: the predictor $$A_{pred,i}^{(j)},$$

and the updated feature, then estimates the mean ($\mu$) and the variance ($\sigma^2$) of the current voxel group $$A_i^{(j)}.$$

Within the Distribution Estimator, it simply let the mean be the predictor $$A_{pred,i}^{(j)}, \text{ i.e., } \mu = A_{pred,i}^{(j)}.$$

Additionally, the variance $\sigma^2$ is estimated with a neural network module, which can be constructed with 3D sparse convolutional layers, Inception ResNet (IRN) blocks, transformer blocks, etc.

(5) The Integrator module (450) is launched to compute the probability distributions $$P_i^{(j)}$$

for the current voxel group $$A_i^{(j)}.$$

Assuming the probability distribution follows a certain parametric form (e.g., Gaussian distribution or Laplace distribution), the Integrator integrates the continuous probability density function with the input mean ($\mu$) and the variance ($\sigma^2$), and outputs the probability distributions of $$A_i^{(j)}$$

to assist arithmetic encoding. Note that Distribution Estimator (440) and the Integrator module (450) together forms the probability estimator for the upcoming arithmetic coding. They are introduced in a commonly owned U.S. application Ser. No. 18/825,407, entitled "Parameterized Arithmetic Coding for Point Cloud Attribute Compression".

(6) Finally, the Arithmetic Encoder (460) is launched to encode the current voxel group $$A_i^{(j)}$$

into a sub-bitstream $BS_j$, all the sub-bitstreams together forms the output bitstream BS of the Attribute Encoding module.

Attribute Decoding: The Attribute Decoding module (FIG. 5) is very similar to the Attribute Encoding module, which also operates in an iterative manner for each voxel group. The only difference lies in the last step. Instead of launching Arithmetic Encoder in FIG. 4, the Attribute Decoding (FIG. 5) invokes the Arithmetic Decoder module (560).

The Arithmetic Decoder module takes as inputs the estimated probability distribution $$P_i^{(j)}$$

for the current voxel group $$A_i^{(j)}$$

and the sub-bitstream $BS_j$, and decodes the current voxel group $$A_i^{(j)}.$$

All the decoded voxel groups together form the decoder output $A_i$.

Proposed Attribute Encoding and Attribute Decoding

The weakness in the designs of FIG. 4 and FIG. 5 is that, the Attribute Estimator module always set the output predictor $$A_{pred,i}^{(j)}$$

to be the j-in voxel group or $A_{up,i-1}$, without considering the already encoded/decoded attributes $$A_i^{(1)}, A_i^{(2)}, \dots, A_i^{(j-1)}.$$

To resolve this issue, we propose to update the Attribute Encoding module and the Attribute Decoding module, letting the attribute estimation to considers the already encoded/decoded voxel groups $$A_i^{(1)}, A_i^{(2)}, \dots, A_i^{(j-1)}$$

in each coding iteration, so that the quality of the predictor $$A_{pred,i}^{(j)}$$

also improves progressively iteration by iteration.

Figure 6:
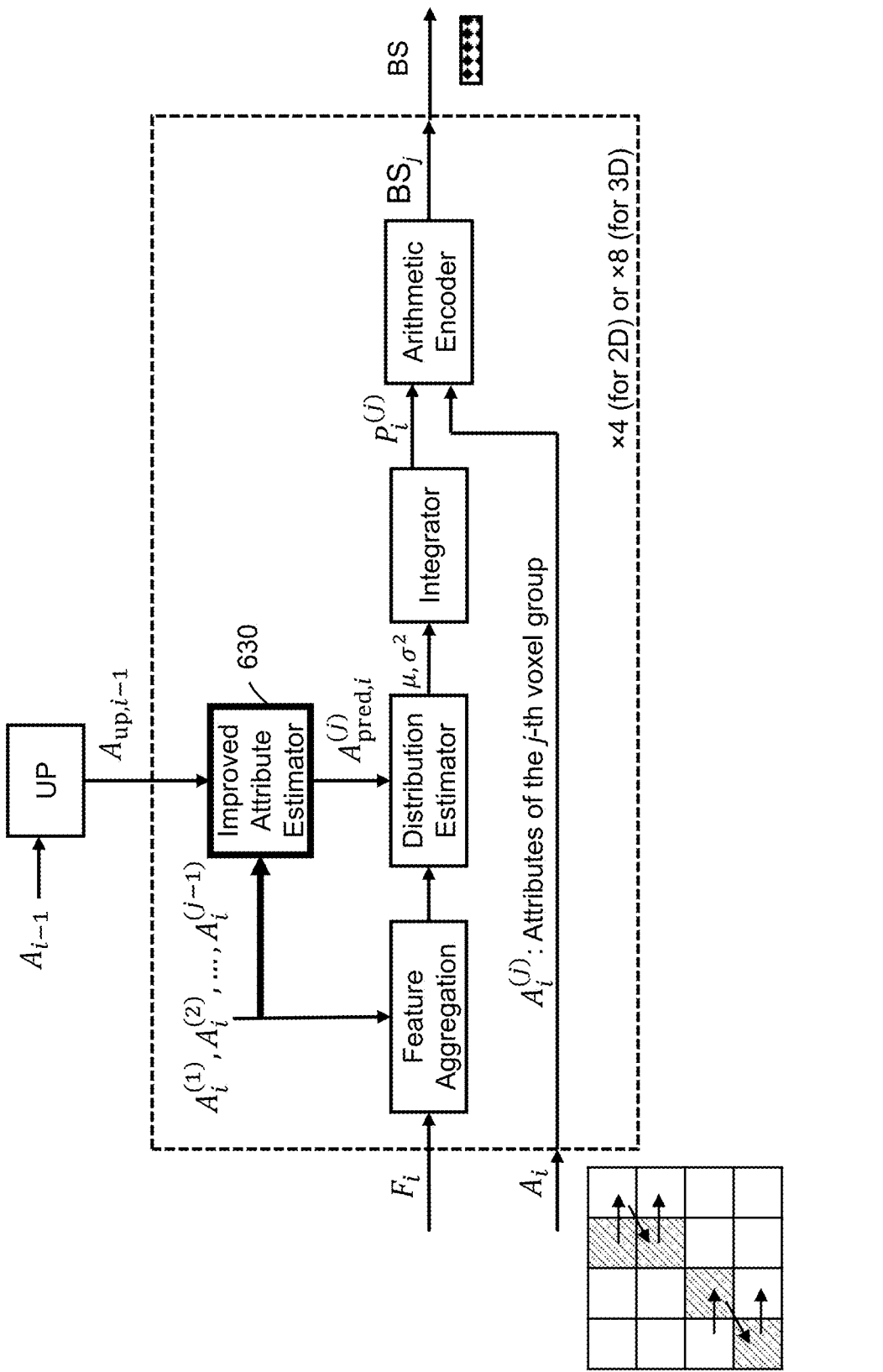
FIG. 6 illustrates a proposed attribute encoding module, according to one embodiment.
Figure 7:
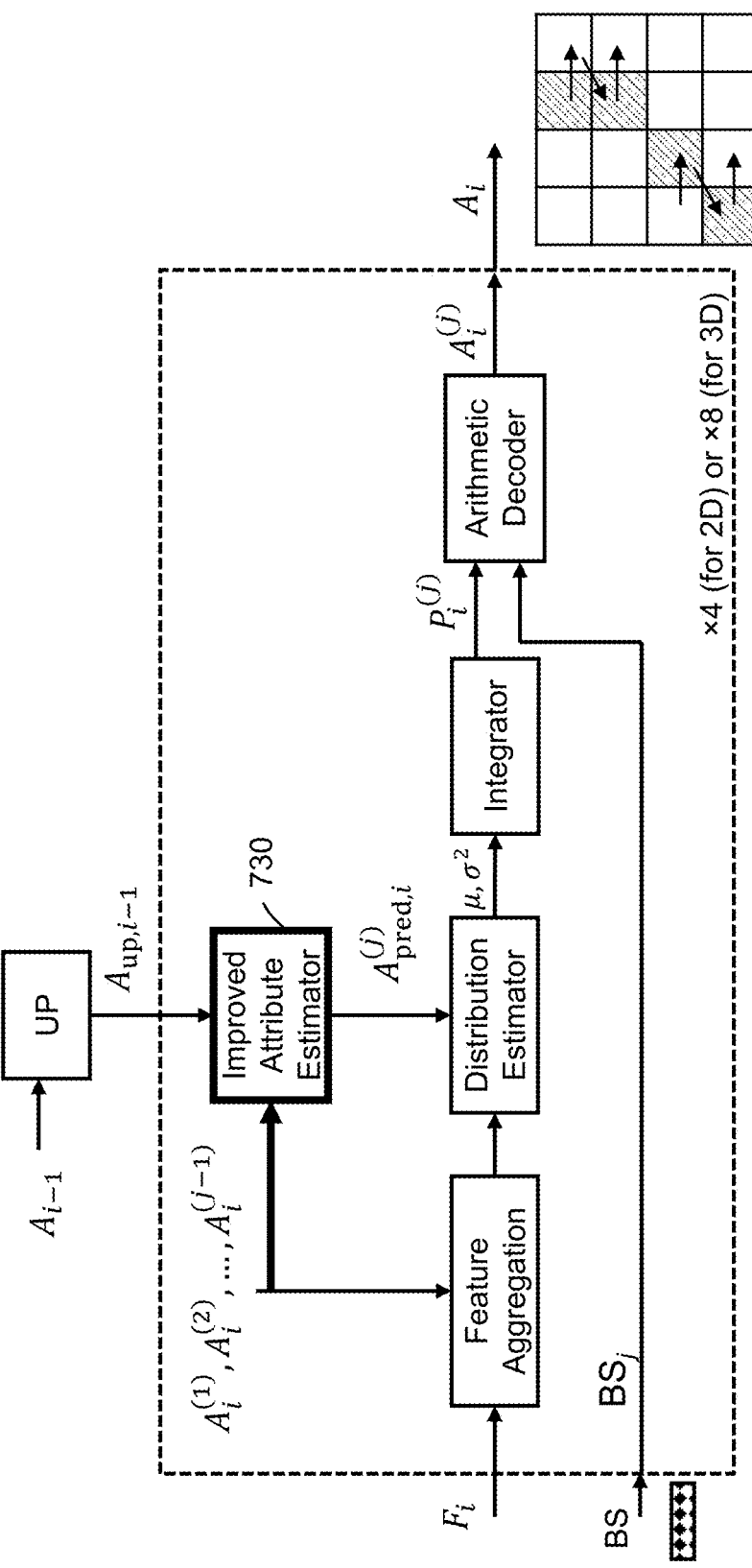
FIG. 7 illustrates a proposed attribute decoding module, according to one embodiment.

The proposed Attribute Encoding and Attribute Decoding modules are shown in FIG. 6 and FIG. 7, respectively, according to an embodiment. By comparing FIG. 6 and FIG. 4, one sees, that in FIG. 6, the attribute estimation is based on the Improved Attribute Estimator module (630). Different from the Attribute Estimator (430) in FIG. 4, the Improved Attribute Estimator module additionally takes the already encoded/decoded voxel groups $$A_i^{(1)}, A_i^{(2)}, \dots, A_i^{(j-1)}$$

as input. Similarly, the proposed Attribute Decoding module (FIG. 7) also performs attribute estimation based on the Improved Attribute Estimator module (730), which use the already decoded voxel groups $$A_i^{(1)}, A_i^{(2)}, \dots, A_i^{(j-1)}$$

as input.

Improved Attribute Estimator

Different from the original Attribute Estimator in FIG. 4 and FIG. 5, the Improved Attribute Estimator (630, 730) is able to improve the quality of the output predictor as the coding $$A_{pred,i}^{(j)}$$

as the coding process continues. We hereby provide its detailed design.

Embodiment 1

In one embodiment, the Improved Attribute Estimator (630, 730) can be implemented in a deterministic manner without using neural networks. After applying the Upsampling module in FIG. 6 or FIG. 7, each voxel in $A_{i-1}$ will be associated with a 2×2×2 cube in the 3D space at level i. The underlying motivation of this embodiment is to compute the predicted attribute values at level i so that the average attribute value of each 2×2×2 cube always stays the same as the attributed value of the corresponding parent voxel in $A_{i-1}$.

For illustration purposes, we take a particular 2×2×2 cube as an example. Suppose this cube corresponds to a voxel with attribute value $a_{i-1}$ from $A_{i-1}$. Additionally, we suppose in this cube, there are k occupied voxels with attribute values $$a_i^{(m)},$$

m=1, . . . , K. Moreover, the already encoded/decoded attribute values in the 2×2×2 cube are denoted as $$a_i^{(1)}, a_i^{(2)}, \dots, a_i^{(j-1)},$$

where $$a_i^{(1)} \in A_i^{(1)}, a_i^{(2)} \in A_i^{(2)}, \dots, a_i^{(j-1)} \in A_i^{(j-1)}.$$

Our target is to compute a predicted attribute value for the j-th voxel group (denoted as $$a_{pred,i}^{(j)}).$$

By assuming that the remaining attribute values to be predicted in the 2×2×2 cube are the same and that the average attribute values of all the k occupied voxels in the 2×2×2 cube always give the attribute value of their parent, i.e., di-1, we have the following:

$$\frac{1}{k}\left(\sum_{n<j} a_i^{(n)} + (k-(j-1))a_{pred,i}^{(j)}\right) = a_{i-1}$$

As a result, we have:

$$a_{pred,i}^{(j)} = \frac{ka_{i-1} - \sum_{n<j} a_i^{(n)}}{k-(j-1)}$$

Note that when $$j = 1, a_i^{(1)} = a_{i-1}.$$

By computing all the predicted attribute values $$a_{pred,i}^{(j)}$$

for each 2×2×2 cube at the i-th octree level, these predicted attribute values together form the output predicted attribute $$A_{pred,i}^{(j)}.$$

The above computation can be described in the following pseudo codes, where $$a_{pred,i}^{(j)},$$

j=1, . . . , k, is sequentially calculated from one voxel group to next voxel group.

13 for j=1, . . . , k $$a^{(j)}_{pred,i} = \frac{ka_{i-1} - \sum_{n<j} a^{(n)}_i}{k - (j - 1)},$$

for all voxels in voxel group $$A^{(j)}_i.$$

Embodiment 2

Figure 8:
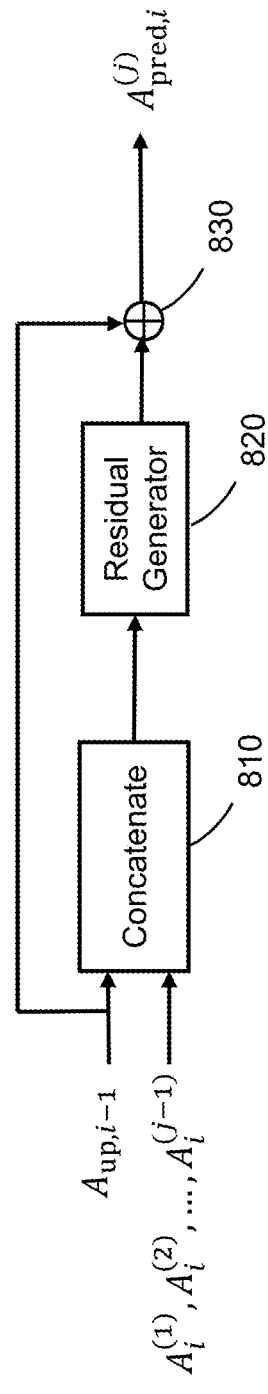
FIG. 8 illustrates an improved attribute estimate module, according to one embodiment.

In another embodiment, the Improved Attribute Estimator (630, 730) is implemented with a neural network module, as illustrated in FIG. 8.

The proposed Improved Attribute Estimator module takes the design of a residual network. Firstly, the already encoded/decoded voxel groups $$A^{(1)}_i, A^{(2)}_i, \ldots , A^{(j-1)}_i$$

and the upsampled attribute $A_{up,i-1}$ are concatenated (810) together to form a 3D sparse tensor. Next, it is fed to a Residual Generator module (820), where the Residual Generator is a neural network-based module, it can be constructed with 3D sparse convolutional layers, Inception ResNet (IRN) blocks, transformer blocks, etc. The Residual Generator module (820) outputs the residual of the predicted attribute for the current voxel group. Next, The Residual Generator output is added (830) back to the upsampled attribute $A_{up,i-1}$, leading to the predicted attribute $$A^{(j)}_{pred,i}.$$

One or more embodiments provide a computer program comprising instructions which when executed by one or more processors cause such processors to perform the encoding and/or decoding methods according to any of the embodiments described above. One or more embodiments also provide a computer readable storage medium having stored thereon instructions for encoding or decoding point cloud data according to the methods described above.

One or more embodiments provide a computer readable storage medium having stored thereon point cloud data generated according to the methods described above. One or more embodiments also provide a method and apparatus for transmitting or receiving point cloud data generated according to the methods described above.

The embodiments described herein may be implemented in, for example, a method or a process, an apparatus, a software program, a data stream, or a signal. Even if only discussed in the context of a single form of implementation (e.g., as a method), the implementation of such features may also be implemented in other forms. An apparatus may be implemented in, for example, appropriate hardware, software, and firmware. Corresponding methods may be implemented in, for example, a processor.

Various numeric values are used in the present application. Such specific values are for example purposes and the embodiments described are not limited to these specific values.

Various methods are described herein, and such methods comprise one or more steps or actions for achieving the described method. Unless a specific order of steps or actions is required for the proper operation of the method, the order and/or use of specific steps and/or actions may be modified or combined. Additionally, terms such as "first", "second", etc. may be used in various embodiments to modify an element, component, step, operation, etc., for example, a "first decoding" and a "second decoding". Use of such terms does not imply an order to the operations unless specifically required.

The present disclosure may refer to "determining" various pieces of information. Determining information may include one or more of, for example, estimating, calculating, predicting, or retrieving (e.g., from memory) the information.

The present disclosure may refer to "accessing" various pieces of information. Accessing information may include one or more of, for example, receiving, retrieving (e.g., from memory), storing, moving, copying, calculating, determining, predicting, or estimating the information. Similarly, the present disclosure may refer to "receiving" various pieces of information. Receiving information may include one or more of, for example, accessing or retrieving (e.g., from memory) the information.

It is to be understood that use of any of the following "/", "and/or", and "at least one of" is intended to encompass all possible selections of listed items, taken either individually or in any combination thereof.

While specific embodiments have been described in the foregoing description in connection with the accompanying drawings, it should be understood that embodiments described herein are examples only and should not be taken as limiting the scope of the present disclosure or the following claims. Although features and elements are described herein in particular combinations, those of ordinary skill in the art will appreciate that such features or elements may be used alone or in any combination with the other features and elements. It is understood, therefore, that the overall teachings of the present disclosure are not limited to the particular embodiments, implementations, and examples disclosed herein, but are intended to cover variations, modifications, and alternatives as defined by the appended claims and any and all equivalents thereof.

The invention claimed is:

1. A method of decoding point cloud data, comprising:
   obtaining upsampled attributes of a previous octree level of the point cloud data;
   predicting attributes of a current voxel group of a current octree level of the point cloud data, based on attributes of already decoded voxel groups in the current octree level and the upsampled attributes of the previous octree level;
   obtaining a probability distribution of the current voxel group, based on the predicted attributes of the current voxel group; and
   decoding the current voxel group from an input bitstream, based on the probability distribution of the current voxel group.

2. The method of claim 1, wherein the predicting attributes of a current voxel group is based on a sum of attribute values of already decoded voxel groups.

3. The method of claim 1, wherein the predicting attributes of a current voxel group is based on that an average of remaining attribute values to be predicted and already decoded voxel groups at the current octree level being same as an attribute value of a corresponding parent voxel at a previous octree level.

4. The method of claim 1, wherein attributes of the current octree level are predicted sequentially from one voxel group to next voxel group.

5. The method of claim 1, wherein the predicting attributes of a current voxel group is based on a neural network.

6. A method of encoding point cloud data, comprising:

obtaining upsampled attributes of a previous octree level of the point cloud data;

predicting attributes of a current voxel group of a current octree level of the point cloud data, based on attributes of already encoded voxel groups in the current octree level and the upsampled attributes of the previous octree level;

obtaining a probability distribution of the current voxel group, based on the predicted attributes of the current voxel group; and encoding the current voxel group based on the probability distribution of the current voxel group.

7. The method of claim 6, wherein the predicting attributes of a current voxel group is based on a sum of attribute values of already encoded voxel groups.

8. The method of claim 6, wherein the predicting attributes of a current voxel group is based on that an average of remaining attribute values to be predicted and already decoded voxel groups at the current octree level being same as an attribute value of a corresponding parent voxel at a previous octree level.

9. The method of claim 6, wherein attributes of the current octree level are predicted sequentially from one voxel group to next voxel group.

10. The method of claim 6, wherein the predicting attributes of a current voxel group is based on a neural network.

11. An apparatus for decoding point cloud data, comprising one or more processors and at least one memory coupled to the one or more processors, wherein the one or more processors are configured to:

obtain upsampled attributes of a previous octree level of the point cloud data;

predict attributes of a current voxel group of a current octree level of the point cloud data, based on attributes of already decoded voxel groups in the current octree level and the upsampled attributes of the previous octree level;

obtain a probability distribution of the current voxel group, based on the predicted attributes of the current voxel group; and decode the current voxel group from an input bitstream, based on the probability distribution of the current voxel group.

12. The apparatus of claim 11, wherein the predicting attributes of a current voxel group is based on a sum of attribute values of already decoded voxel groups.

13. The apparatus of claim 11, wherein the predicting attributes of a current voxel group is based on that an average of remaining attribute values to be predicted and already decoded voxel groups at the current octree level being same as an attribute value of a corresponding parent voxel at a previous octree level.

14. The apparatus of claim 11, wherein attributes of the current octree level are predicted sequentially from one voxel group to next voxel group.

15. The apparatus of claim 11, wherein the predicting attributes of a current voxel group is based on a neural network.

16. An apparatus for encoding point cloud data, comprising one or more processors and at least one memory coupled to the one or more processors, wherein the one or more processors are configured to:

obtain upsampled attributes of a previous octree level of the point cloud data;

predict attributes of a current voxel group of a current octree level of the point cloud data, based on attributes of already encoded voxel groups in the current octree level and the upsampled attributes of the previous octree level;

obtain a probability distribution of the current voxel group, based on the predicted attributes of the current voxel group; and encode the current voxel group based on the probability distribution of the current voxel group.

17. The apparatus of claim 16, wherein the predicting attributes of a current voxel group is based on a sum of attribute values of already encoded voxel groups.

18. The apparatus of claim 16, wherein the predicting attributes of a current voxel group is based on that an average of remaining attribute values to be predicted and already decoded voxel groups at the current octree level being same as an attribute value of a corresponding parent voxel at a previous octree level.

19. The apparatus of claim 16, wherein attributes of the current octree level are predicted sequentially from one voxel group to next voxel group.

20. The apparatus of claim 16, wherein the predicting attributes of a current voxel group is based on a neural network.

* * * * *